(12) United States Patent
Frederiksen et al.

(10) Patent No.: US 6,411,787 B1
(45) Date of Patent: Jun. 25, 2002

(54) INDEPENDENT DESCRIPTION SELECTOR APPARATUS AND METHOD

(75) Inventors: Dellas G. Frederiksen, Boise, ID (US); Kendra Dunlap, Beaverton, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/800,845

(22) Filed: Mar. 6, 2001

(51) Int. Cl.[7] .......... G03G 21/00; G03G 15/00
(52) U.S. Cl. .......................................... 399/81
(58) Field of Search ................. 399/81, 82, 85, 399/8, 9; 361/681

(56) References Cited

U.S. PATENT DOCUMENTS 5,880,727 A * 3/1999 Barrett et al. .............. 399/81 X
5,999,767 A * 12/1999 Ando ........................... 399/85
6,026,258 A *  2/2000 Fresk et al. .................... 399/81
6,075,925 A *  6/2000 Downing et al. ......... 399/81 X

FOREIGN PATENT DOCUMENTS

JP          11-194669       *  7/1999

* cited by examiner

*Primary Examiner*—Sophia S. Chen

(57) ABSTRACT

An independent description selector (10) includes, in a mopier/copier for making a copy of an original, an independent original selector device (16) for selection of parameters (18) describing the original (14). An independent copy selector device (20) is provided for the selection of parameters (22) describing the copy (12). In a preferred embodiment, an input device (88) is connected to the original selector (16) and to the copy selector (20) for adding (90). In a further embodiment, an audio/visual device (76) is connected to the mopier/copier so that parameters (18 and 22) are audibly (78) and visually (80) described as selected.

17 Claims, 2 Drawing Sheets

INDEPENDENT DESCRIPTION SELECTOR APPARATUS AND METHOD

FIELD OF THE INVENTION

This invention relates to an independent description selector apparatus and method. In particular, the invention relates to an apparatus and method of providing an independent intuitive description selector in a mopier/copier for making a copy of an original.

BACKGROUND OF THE INVENTION

A "mopier" is a new category of networked printers optimized to produce multiple original prints (mopies). Hewlett/Packard Company originally introduced the first mopier in 1996. Mopies are an efficient, low-cost, higher-print quality alternative to photocopies. Mopiers also have the capability of functioning as traditional copiers do. That is, just as copiers are useful in producing multiple "reproductions" of originals, mopiers can accomplish this task as well by providing multiple originals.

A problem exists with mopiers/copiers known in the art, however, at the point of the user interface with the machine. The traditional mopier/copier interface provides features based on function. For instance, two-sided copying is presented as "1-1, 1-2,2-1, 2-2" and page-to-page scaling is presented as "legal-to-letter, A4-to-letter, etc.". That is to say, this type of interface, now known in the art, provides preselected or "canned" choices which are unchangeably "linked" together and which, while easy-to-use, have some drawbacks. For example, it is not always clear to a user where to go in the interface to find the functionality the user is looking for. For instance, does page-to page scaling go under "page size" or "scaling"? Further, these prior art "canned" choices are linked by the interface designer in the sense that the designer couples a possible original choice with a possible copy choice. Combinations that are useful and obvious to the designer, however, may not be so obvious or useful to the ordinary user and, typically, the user is powerless to change them.

The known interfaces are even more awkward and difficult to use because some features are difficult to name and/or categorize. This causes an interface designer to simply add broad, new categories when new features come along. This in turn tends to clutter the user interface. Alternatively, the interface designer may lump these features into a catch-all category such as "advanced features" because it is unclear even to the designer where to put them.

A related problem with the known mopier/copier interfaces is the inability to provide a list that is both comprehensive and usable. That is, for instance, if a mopier/copier allows eight paper sizes then an exhaustive list of page-to page scaling choices requires a list of sixty-four canned choices. A list that is overwhelming to the typical user. In short, no matter how good a copy a mopier/copier can produce, if it is confusing and difficult to use, it is more likely that it will not be used.

Further, in the traditional functions-based copier interface, features that may interact with each other such as "booklet mode" and "center staple" (center stapling is not enabled unless booklet mode is chosen) may actually be in two different places in the interface. Thus, the user may not be aware that when they choose "booklet mode" that "center stapling" is now available.

Thus, in a mopier/copier for making a copy of an original, there is a need in the art for an independent description selector. In particular, there is a need in the art for an intuitive independent description selector that is easy-to-use, easy to update, and which provides a user with intuitive choices. It, therefore, is an object of this invention to provide an independent description selector in a mopier/copier for making a copy of an original that accommodates the needs of both designers and users.

SUMMARY OF THE INVENTION

Accordingly, the independent description selector apparatus and method of the present invention includes, in a mopier/copier for making a copy of an original, an independent original selector device for selection of parameters describing the original. An independent copy selector device is provided for selection of parameters describing the desired copy. In a preferred embodiment, the invention further includes an input device connected to the independent original selector device and to the copy selector device for adding and deleting parameters. In a still further embodiment, an audio/visual device is connected to the mopier/copier so that parameters are audibly and visually described as selected. In another preferred embodiment, the independent original selector device further includes an ordered list of available parameters for describing the original. In a further preferred embodiment, the independent copy selector device further includes an ordered list of available parameters for describing a copy. In other preferred embodiments, the available parameters are selected from a group including binding, color, graphics, number of sides, orientation, text and size.

In a further preferred embodiment of the invention, in a mopier/copier for making a copy of an original, an independent description selection method includes the steps of adding a list of parameters describing an original to the mopier/copier. An independent list of parameters describing a copy is added to the mopier/copier. Then, an independent original selector device is connected to the mopier/copier for selection of parameters describing an original. Next, an independent copy selector device is connected to the mopier/copier for selection of parameters describing a copy from the independent list of parameters describing the copy. Then, parameters are selected describing the original and, finally, parameters are selected from the independent list describing the copy to be created.

In a preferred embodiment of the method, the step of selecting parameters from a group including binding, color, graphics, number of sides, orientation, text and size, is added. In a still further embodiment, an input device is connected to the mopier/copier for adding and deleting parameters. In another preferred embodiment, an audio/visual device is connected to the mopier/copier so that parameters are audibly and visually described as selected.

In still another preferred embodiment, in a mopier/copier for making a copy of an original, computer code is recorded on a computer readable medium for providing an independent description selection system and includes computer code for an independent original selector for selection of parameters describing the original. Further, it includes computer code for an independent copy selector device for selection of parameters describing a desired copy. In a further embodiment, it includes computer code for providing an ordered list of available parameters for the independent original selector and the independent copy selector. In another preferred embodiment computer code is provided for selecting available parameters from a group including binding, color, graphics, number of sides, orientation, text and size. In yet another preferred embodiment, computer code is provided for adding and deleting parameters. Finally, in a preferred embodiment, computer code provides for audio/visual descriptions of parameters as selected.

BRIEF DESCRIPTION OF THE DRAWINGS

Other objects, features, and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
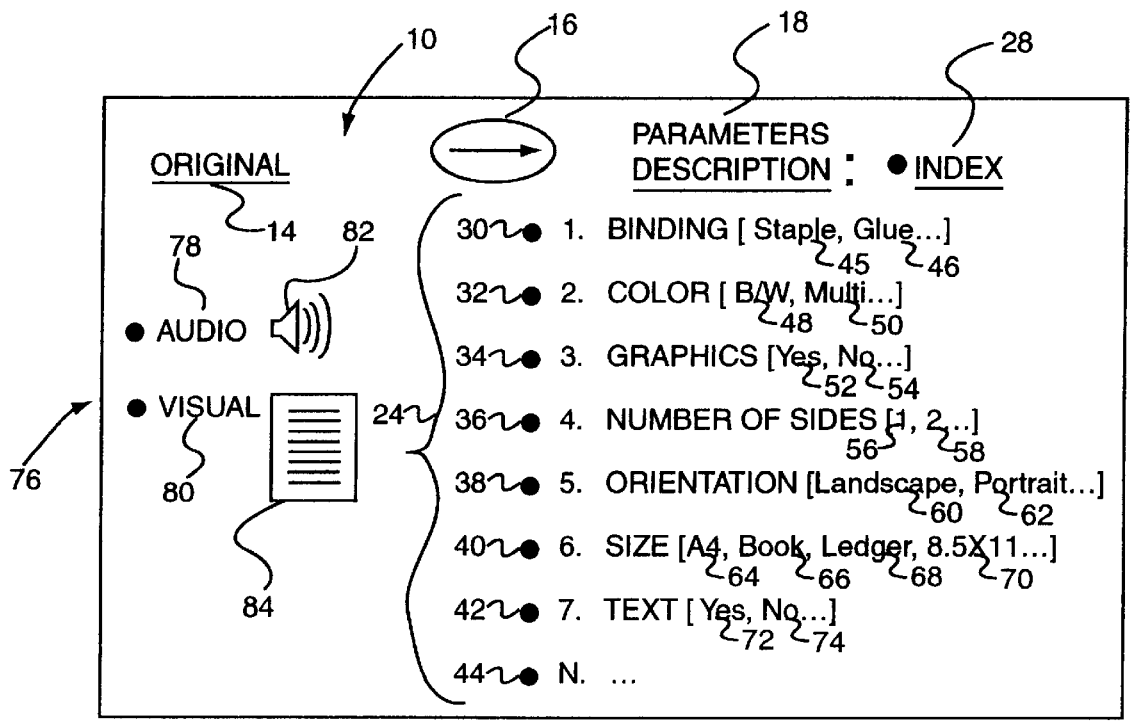
FIG. 1 is a schematic diagram of a preferred embodiment of the independent description selector of the present invention illustrating the "original" description mode.
Figure 2:
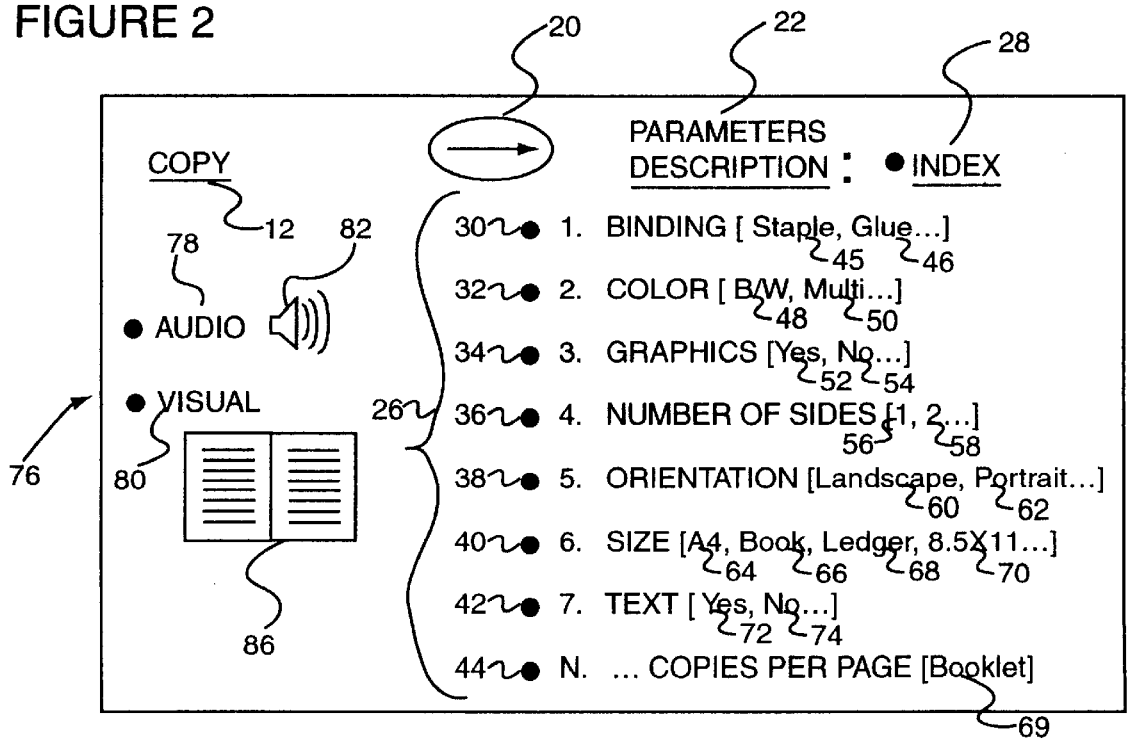
FIG. 2 is a schematic diagram illustrating the "copy" description mode.
Figure 3:
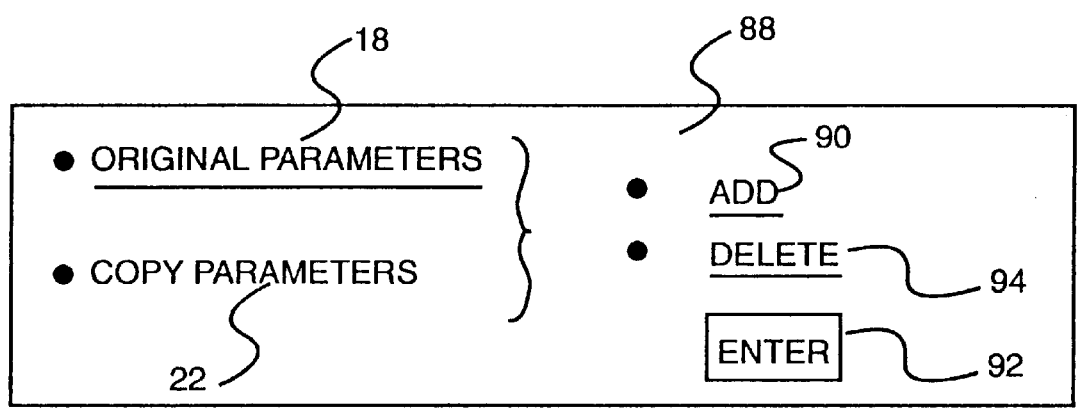
FIG. 3 is a schematic diagram illustrating the parameter add-delete mode of the present invention.

The preferred embodiment of the present invention is illustrated by way of example in FIGS. 1–3. With specific reference to FIGS. 1 and 2, the independent description selector 10 of the present invention includes, in a mopier/copier (not shown) for making a copy 12 of an original 14, an independent original selector device 16 for the selection of parameters 18 describing the original 14. For the purposes of the invention herein, the term "original" is used to identify the object, most typically a document, to be reproduced in the form of a copy 12. In the most usual case, the original 14 will be an original document in tangible form to be reproduced and/or copied. Certainly, the scope of the invention also includes all original objects that are not documents.

Independent description selector 10 of the present invention also includes independent copy selector device 20 for the selection of parameters 22 describing the copy 12. FIGS. 1 and 2 show independent original selector device 16 and independent copy selector device 20 in the form of a "button" for a user to activate. As is well known in the art, independent original selector device 16 and independent copy selector device 20 may take the form of an icon on a computer screen that the user activates by clicking on with a mouse activated arrow, for example. Obviously, the hardware, as in the mopier/copier machines, may contain buttons and the machines may be connected to a network of computers and remotely controlled by software too.

In a preferred embodiment, the independent original selector device 16 includes an ordered list 24 of available parameters 18. Likewise, in a preferred embodiment, the independent copy selector device 20 includes an ordered list 26 of available parameters 22. Ordered list 24 and ordered list 26 may be ordered in any convenient, useful manner. FIGS. 1 and 2 illustrate ordered list 24 and ordered list 26 organized alphabetically as well as numerically. Each ordered list may also include an index 28. Index 28 is a comprehensive listing of all available parameters searchable, as is known in the art, for a designer's or user's convenience.

Any parameters useful in describing original 14 and/or copy 12 may be utilized by way of the present invention. By way of example only, useful parameters include: binding 30, color 32, graphics 34, number of sides 36, orientation 38, size 40, and text 42. Additional "N" parameters 44 may be added, as will be discussed more fully hereafter. Further, each of these parameters may include additional choices too. For example, binding 30 parameter may include the choices of staple 45 and glue 46. Color 32 parameter may include black and white 48 and multiple 50. Graphics 34 parameter may include yes 52 and no 54. Number of sides 36 parameter may include one side 56 and two sides 58, for example. Orientation 38 parameter may include landscape 60 and portrait 62. Size 40 parameter may include A4 (64), book 66, ledger 68, 8 ½ by 11 (70), and so forth. Text 42 parameter may include yes 72 and no 74, for example. Other parameters include "copies per page" selections, such as booklet 69, for example.

Importantly, referring now specifically to FIG. 2, independent copy selector device 20 may have parameter descriptions 22 different from, and/or substantially identical to, parameter descriptions 18 as described above. Nonetheless, independent copy selector device 20 is just that. That is, while it may be "linked" in some way to the selection made by independent original selector device 16, it is, in fact, fully independent from independent original selector device 16 and any parameter descriptions 18 selected by a user to describe the original 14. For instance, if the user described the original 14 as a "two-sided" 58 document, the independent copy selector 20 automatically indicates that a "two-sided" 58 copy will be made. Because that is the logical, normal, intuitive choice, this saves the user steps, as well. However, because independent copy selector 20 is in fact independent from the original selector device 16, a user is free to change the format of the copy 12 as needed.

By way of further explanation, independent description selector 10 departs from the prior art "functions" based approach and, instead, is based upon a "describe what you have and describe what you want" approach. As illustrated, the two categories of independent description selector 10 are: original 14 and copy 12. Under the original 14 "button", the user describes exactly what the original 14 document looks like: what size it is, what the orientation of the image is, whether it is one-sided or two-sided, whether it is made up of text or graphics, etc. Under the copy 12 "button", the user chooses parameters 22 that exactly describe what the desired copy is to look like. Fully independent of the original 14 selections and descriptions, the user decides: what size the copy 12 should be, should it be one-sided, or two-sided, should it have multiple copies per page, should it be stapled, etc. As a result, in accordance with the present invention, it is intuitively easy for a user to obtain exactly the type of copy 12 desired. The advanced feature of "book mode" on traditional, prior art, mopier/copier's, for example, is simply an original 14 page size in accordance with the present invention. Likewise, the advanced feature of "booklet making" simply becomes a copy parameter 22 that is applied to the copy 12. The prior art difficulty with page-to page scaling becomes a non-issue, for example. In accordance with the present invention, a user simply specifies the original 14 paper size and the desired copy 12 paper size. All sixty-four combinations are thereby available intuitively without overwhelming the user with canned, linked choices.

Still further, in accordance with the present invention, the need for some choices which existed in the prior art, simply disappears. For instance, if the original 14 page has been described to have an image that is oriented in a "landscape" fashion, then a landscape copy 12 will be stapled in the appropriate lower left location automatically, unless the user wants it stapled elsewhere on the copy 12. In a similar manner, four-up copies per page is automatically oriented differently, based on the description of the original 14 page orientation. In sum, in accordance with the present invention features are easy to find and some previously hard to describe features such as "book mode", become easy to use.

Still referring to FIGS. 1 and 2, another preferred embodiment of the present invention is illustrated. In this embodiment, an audio/visual device 76 is connected to the mopier/copier so that parameters 18 and 22 are audibly 78 and visually 80 described as the parameters are selected. That is, in accordance with the present invention, when a user selects size (40) 8 ½ by 11 (70) as accurately describing the original 14, the words "8 ½ by 11" are heard and audio icon 82 blinks or indicates in some other appropriate way it is functioning. Additionally, original icon 84 assumes the visual shape of a letter 8 ½ by 11.

Likewise, as the user describes the intended copy 12, for example size 40 ledger 68, audio icon 82 blinks and the word "ledger" is heard. Also, copy icon 86 assumes the ledger 68 size, as illustrated in FIG. 2.

Referring now to FIG. 3, in a preferred embodiment, input device 88 is connected to independent original selector device 16 and to independent copy selector device 20. In accordance with the present invention, the difficulty of adding and deleting parameters as encountered with the prior art is overcome. Should a new feature become available, a user simply selects original parameters 18 and then selects the "add" button 90 and then selects "enter" 92. Should a feature become obsolete, the user selects either original parameter 18 or copy parameter 22 or both, as appropriate, and then selects the "delete" button 94 and hits enter 92.

In use, an interface designer simply and intuitively describes all the original parameters 24 and copy parameters 22 that the mopier/copier he or she is designing can handle. These parameters, preferably, are set forth in an ordered list. Importantly, once again, copy parameters 22 are fully independent of original parameters 18, even though the parameters may be substantially similar and may be intuitively linked to save a user steps in the normal case. A user, then, simply observes the original 14 and describes it completely, simply, and intuitively by selecting the appropriate original parameters 18 from the ordered list 24. Each selection that a user makes, in a preferred embodiment, results in an audio and visual response as described above. Thereafter, a user simply selects copy parameters 22 from ordered list 26 such that the copy 12 conforms to the user's intended form. Once again, each selection of a copy parameter 22 results in an audio and visual response as described above, in a preferred embodiment. By way of the present invention, the separation of the original parameters 24 and copy parameters 22 creates a more natural and logically easier to understand means for inputting the parameters needed to accomplish a copy job.

Further, as an interface designer develops new parameters, they can be simply and easily added by means of input device 88 as described above. Likewise, a user can add or delete parameters as necessary. Thus, independent description selector 10 of the present invention always provides a user with the simplest, most up-to-date, easy to use parameters thereby making the user's interface with the mopier/copier much more productive than has been possible heretofore.

While the present invention has been disclosed in connection with the preferred embodiment thereof, it should be understood that there may be other embodiments which fall within the spirit and scope of the invention as defined by the following claim.

What is claimed:

1. In a mopier/copier for making a copy of an original, an independent description selector apparatus comprising:
   a) an independent original selector device for selection of parameters describing the original;
   b) an independent copy selector device for selection of parameters describing the copy; and
   c) an input device connected to said independent original selector device and to said independent copy selector device for adding and deleting parameters.

2. The apparatus of claim 1 further comprising an audio/visual device connected to said mopier/copier so that parameters are audibly and visually described as selected.

3. The apparatus of claim 1 wherein the independent original selector device further comprises an ordered list of available parameters for describing the original.

4. The apparatus of claim 3 wherein the available parameters are selected from a group including: binding, color, graphics, number of sides, orientation, text and size.

5. The apparatus of claim 1 wherein the independent copy selector device further comprises an ordered list of available parameters for describing the copy.

6. The apparatus of claim 5 wherein the available parameters are selected from a group including: binding, color, graphics, number of sides, orientation, text and size.

7. In a mopier/copier for making a copy of an original, an independent description selector apparatus comprising:
   a) an independent original selector device for selection of parameters describing the original;
   b) an independent copy selector device for selection of parameters describing the intended copy of the original;
   c) an input device connected to said independent original selector device and to said independent copy selector device for adding and deleting said parameters; and
   d) an audio/visual device connected to said mopier/copier so that parameters are audibly and visually described as selected.

8. The apparatus of claim 7 wherein the independent original selector device further comprises an ordered list of available parameters for describing the original.

9. The apparatus of claim 7 wherein the independent copy selector device further comprises an ordered list of available parameters describing the intended copy of the original.

10. The apparatus of claim 7 wherein the parameters are selected from a group including: binding, color, graphics, number of sides, orientation, text and size.

11. In a mopier/copier for making a copy of an original, an independent description selection method comprising the steps of:
   a) adding a list of parameters describing an original to said mopier/copier;
   b) adding an independent list of parameters describing a copy to said mopier/copier;
   c) connecting an independent original selector device to the mopier/copier for selection of said parameters describing an original;
   d) connection an independent copy selector device to the mopier/copier for selection of said parameters describing a copy form said independent list of parameters describing a copy;
   e) selecting parameters describing the original;

f) selecting parameters from said independent list of parameters describing the copy to be created; and g) connecting an input device to said mopier/copier for adding and deleting parameters.

12. The method of claim 11 further comprising the step of connecting an audio/visual device to said mopier/copier so that parameters are audibly and visually described as selected.

13. The method of claim 11 further comprising the step of selecting parameters from a group including: binding, color, graphics, number of sides, orientation, text and size.

14. In a mopier/copier for making a copy of an independent original, computer code recorded on a computer readable medium for providing an independent description selection system comprising:

a) computer code for an independent original selector for selection of parameters describing the original;

b) computer code for an independent copy selector device for selection of parameters describing a desired copy of the original; and c) computer code for adding and deleting parameters.

15. The invention of claim 14 further comprising computer code for providing audio/visual descriptions of parameters as selected.

16. the invention of claim 14 further comprising computer code for providing an ordered list of available parameters for said computer code for an independent original selector and said computer code for an independent copy selector device.

17. The invention of claim 16 further comprising computer code for selecting available parameters from a group including: binding, color, graphics, number of sides, orientation, text and size.

* * * * *

UNITED STATES PATENT AND TRADEMARK OFFICE
CERTIFICATE OF CORRECTION

PATENT NO. : 6,411,787 B1
DATED : June 25, 2002
INVENTOR(S) : Fredericksen et al.

It is certified that error appears in the above-identified patent and that said Letters Patent is hereby corrected as shown below:

Column 6,
Line 63, "connection" should read -- connecting --;
Line 65, "form" should read -- from --;

Column 8,
Line 8, "the" should read -- The --.

Signed and Sealed this

Twenty-first Day of September, 2004

JON W. DUDAS
*Director of the United States Patent and Trademark Office*